Sept. 28, 1926.
B. C. BRIDGHAM
1,601,554
ILLUMINATED DISPLAY DEVICE
Filed June 24, 1924
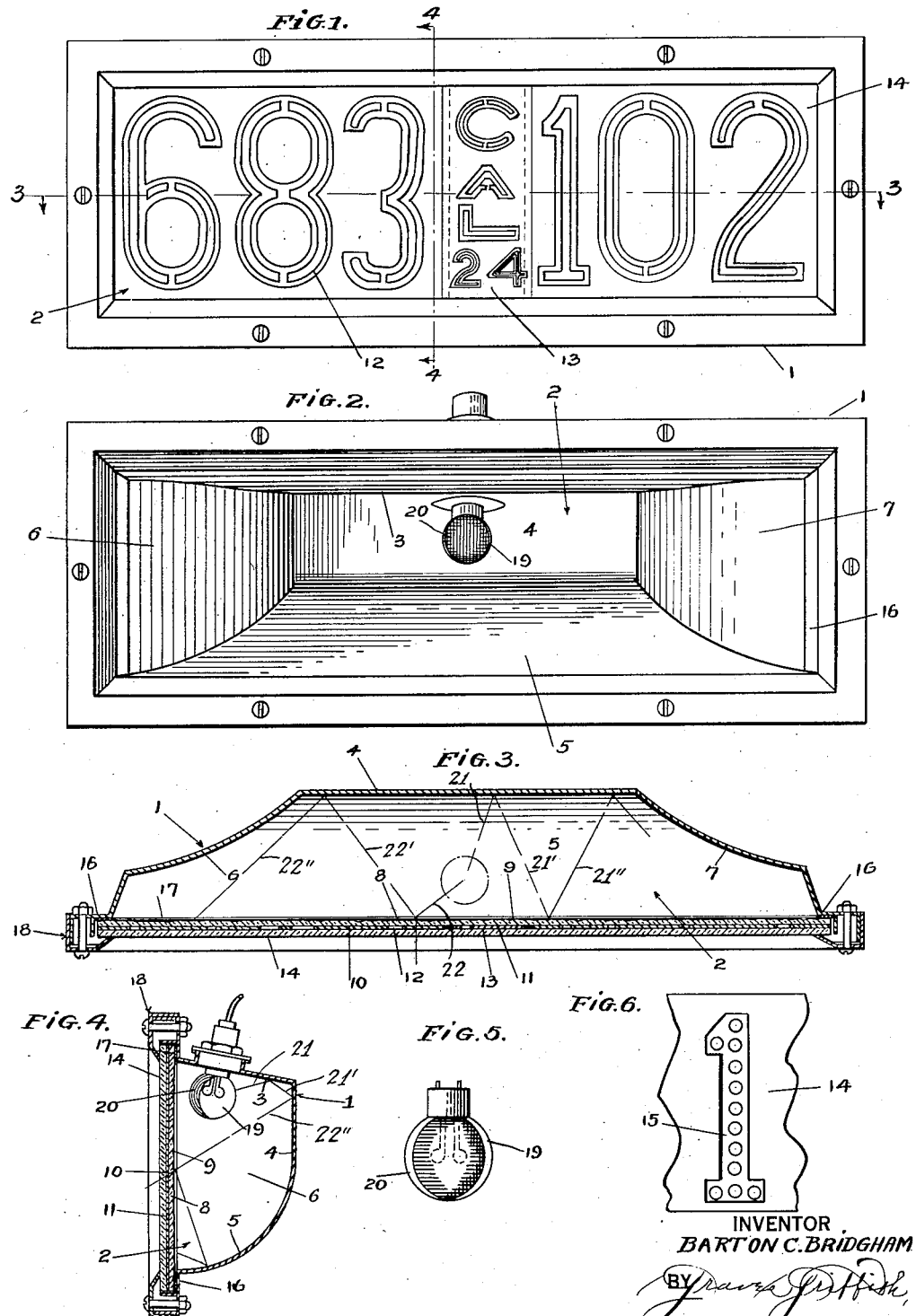
INVENTOR
BARTON C. BRIDGHAM
BY
ATTORNEY Patented Sept. 28, 1926.

1,601,554

UNITED STATES PATENT OFFICE.

BARTON C. BRIDGHAM, OF SAN FRANCISCO, CALIFORNIA.

ILLUMINATED DISPLAY DEVICE.

Application filed June 24, 1924. Serial No. 722,073.

The present invention relates to improvements in illuminated display devices, and more particularly to those used as automobile license-plates, tail-lights, signaling means, signs and such like, and has for a principal object the provision of light dispersive and reflective agencies, in combination with a source of illumination, best calculated to produce a uniform and perfect glow of light free from glare and shadows and of an intensity rendering whatever transparent or translucent bodies it may be passed through to be conspicuously distinguishable and of an unvarying degree of illumination.

Additional to the foregoing is a housing for the constituent elements necessary to the creation of light of the nature described of a construction permitting the removal therefrom of translucent or transparent character or sign-bearing sections and their replacement by new sections bearing such other matter as it may be desired to substitute therefor, with provisions for locking in place, as well as other provisions for rendering the housing impervious to dust and moisture.

The housing may be of any desired design, containing therewithin reflective areas of such combination of curvatures as will best reflect light rays directed thereupon dispersively but in an approximately forward direction, to be received thereafter, in conjunction with the forwardly projected rays of light from the alluminant, by a translucent frontal body-section having a roughened or corrugated inner surface adapted to diffusive reflection of a portion of the light directed thereupon while permitting another portion to be transmitted therethrough, the diffusively reflected portion being thrown back upon the reflective areas to be again diffusively reflected therefrom, filling the interior of the housing with a uniformly diffused glow of light, while the portion transmitted is utilized in the illumination of stenciled or transparent characters.

Though the inner surface of the translucent frontal body-section has been referred to as being roughened or corrugated, there are had in mind other glass surfaces, such as granulated, kinkled, fluted or ondoyant, the latter dispensing with the necessity of using colored glass under conditions requiring it.

It is quite obvious, though not so illustrated, that the outer surface of this translucent frontal section may be made to bear translucent characters surrounded by prepared reflective surfaces tending to turn back through the translucent frontal section such light as does not pass through the translucent characters, and equally so that these features could as well be borne by a separate glass plate superimposed upon the former. The preferred arrangement is to have an opaque plate bear the stenciled characters and have this plate placed between the translucent frontal section and an outer plain glass plate, which, under certain conditions, may be protected by a metallic plate bearing perforated characters similar to those borne by the opaque plate and in registration therewith.

Owing to the necessity of shielding certain sections of the front from the direct passage therethrough of light rays, portions of the surface of the bulb bearing the illuminant element are given a semi-transparent or translucent reflective coating, for which an application for Letters Patent of the United States is about to be filed by me, of a character transmitting a part and reflecting another part of the light rays directed thereupon, an arrangement preventing the casting of shadows, as would be the result if this coating were opaque.

The housing, or casing proper, is of inner contour similar to that of the reflective areas, which are of composite arrangement and adapted to be placed and secured therewithin in such manner as to permit of removal and replacement should the necessity arise.

The reflective areas are comprised interiorly of a central section consisting of an upper plain surface extending rearwardly from the front and slightly inclined from the horizontal, a vertical plain surface extending therefrom and ending in a concave surface terminating at the front, and side wings of convex curvature joined to the respective extremities of said central section, in conjunction with a vertically disposed semi-reflective closure element bearing sign or signal characters.

In effecting a dust and moisture proof juncture of the elements comprising the front of the device with the main body of the casing proper, means similar to those provided for and described in my Letters Patent of the United States for card holder, No. 1,430,282, September 26, 1922, are employed.

Provisions, in license-plates, permitting removal and replacement of a section or sections of the plates carrying stenciled or perforated characters enable one to use indefinitely his license-plate, renewing only that section chronicling the new issues, with a possible change of design to distinguish it from the old and a general touching up of the main body of the plate for appearance sake.

In the accompanying drawings forming a part of this specification, and in which similar characters of reference refer to like parts, throughout,—

Figure 1 is a front elevation of my invention, showing a preferred construction bearing transparent characters.

Figure 2 is also a front elevation, but with the entire front removed, permitting a view of the interior.

Figure 3 is a section on line 3—3 of Figure 1, showing the arrangement of the various elements constituting the device.

Figure 4 is a transverse section on line 4—4 of Figure 1.

Figure 5 is a perspective view of an illuminant in the form of an electric bulb provided with a translucent reflective coating as applied to a selected section of its surface, and Figure 6 is a fragmentary view of a modified form of plate bearing perforations and intended to be substituted for the usual plate bearing transparent characters.

Referring more particularly to the drawings, 1 represents the casing provided interiorly with a plurality of differently disposed reflective areas 2 consisting of a top planar surface 3 of downward and rearward inclination, a vertically disposed planar surface 4, a concave surface 5 extending forwardly from the surface 4, and convex end surfaces 6 and 7, these surfaces being united, as shown in Figure 2, to form the interior reflective system. The front closure consists of a glass plate 8 of any desired color bearing a roughened face 9 and a planar face 10, an opaque plate 11 bearing stenciled characters 12, and a plain outer transparent plate 13.

A flanged element 16 is borne by the front of the casing 1 and is provided with a gasket 17 for dust and moisture exclusion and to afford a seat for the plates 8, 11 and 13 constituting the front closure of the casing.

A flanged clamp member 18 fits over the element 16 and provides a means for securing plate 14 against the flanged element 16, said flanged clamp and member 18 being secured together by clamp screws or bolts, as shown.

An electric light bulb 19 bearing a light transmissive-reflective coating 20 is mounted in the top planar surface 3, said coating being of such character and arrangement as to afford a measure of control over the light emanating from the source of illumination. The break-and-dash lines 21, 21' and 21'' indicate the course of a ray of light from the illuminant after its first reflection by the surface 3, and 22, 22' and 22'' the course of a ray after its first reflection from the surface of plate 8.

In Figure 6 is shown a fragment of a plate 14 of the same dimensions as those of the stenciled plate 11 and that may be substituted therefor, as a modification of the stenciled plate, the numerals 15 being outlined and perforated, as indicated.

In securing the equal dispersion of the light throughout the interior of the casing, with an illumination of the frontal indicia of uniform intensity, recourse is had to an illuminant shielded by a coating both translucent and reflective in combination with a reflective-refractive system adapted to produce a commingling of light rays in such manner as to result in a uniform degree of illumination.

Having thus described my invention, I claim, and desire to secure by Letters Patent:—

In an illuminated display device, the combination of a casing, an illuminant in said casing, said casing including a reflective combination of dissimilarly arranged reflective surfaces comprised of a centrally disposed and rearwardly inclined planar surface, a centrally disposed and substantially vertical planar surface, a centrally disposed and forwardly extending concave surface ending at the front of said casing and convex wing surfaces joined to the extremities of the said vertical planar surface, and at their upper edges to said inclined planar surface, and at their lower edges to said forwardly extending concave surface, and an opaque closure borne by the front of said casing bearing transparent indicia.

BARTON C. BRIDGHAM.